United States Patent [19]

Orlowski

[11] Patent Number: 5,074,567
[45] Date of Patent: Dec. 24, 1991

[54] MODIFIED ONE PIECE LABYRINTH SEAL

[76] Inventor: David C. Orlowski, 3407 - 78th Avenue West, Rock Island, Ill. 61201-0940

[21] Appl. No.: 335,501

[22] Filed: Apr. 10, 1989

[51] Int. Cl.⁵ ............................ F16J 15/44; F16C 33/72
[52] U.S. Cl. ............................ 277/25; 277/14 R; 277/53; 277/67; 277/79; 277/133; 384/135; 384/144; 384/478; 384/480
[58] Field of Search .................. 277/53, 25, 59, 67, 277/68, 79, 133, 201, 206 R, 24, 14 R, 14 V, 1; 415/135, 144, 465, 480; 384/135, 144, 465, 480, 472, 478

[56] References Cited

U.S. PATENT DOCUMENTS

| | | | |
|---|---|---|---|
| 146,116 | 12/1873 | Whitaker et al. | 277/133 X |
| 884,477 | 4/1908 | Emmet et al. | 384/135 |
| 965,399 | 7/1910 | McKee | 277/13 |
| 978,399 | 12/1910 | Rotter | 277/13 |
| 1,269,405 | 6/1918 | Dilg | 384/135 |
| 1,315,822 | 9/1919 | Doran | 384/135 |
| 1,349,329 | 8/1920 | Dispot | 384/135 X |
| 1,572,287 | 2/1926 | Heitman et al. | 277/67 |
| 1,659,450 | 2/1928 | Stromeier | 277/67 |
| 1,732,761 | 10/1929 | Marsland | 277/13 |
| 1,760,463 | 5/1930 | Abenanti | 277/67 |
| 1,886,618 | 11/1932 | Anstice | 384/135 X |
| 1,921,445 | 8/1933 | Van Derhoef | 277/67 X |
| 2,149,712 | 3/1939 | Wallgren | 277/67 X |
| 2,439,917 | 4/1948 | Anderson | 277/67 |
| 2,766,943 | 10/1956 | Lockley et al. | 277/133 X |
| 3,004,782 | 10/1961 | Meermans | 277/67 X |
| 3,184,246 | 5/1965 | Kline | 277/20 GR X |
| 3,575,477 | 4/1971 | Newsome | 384/135 X |
| 3,614,112 | 10/1971 | Herzog | 277/67 X |
| 3,628,560 | 12/1971 | Ettinger | 277/67 X |
| 3,923,313 | 12/1975 | Bailey | 277/63 |
| 4,022,479 | 5/1977 | Orlowski | 277/53 |
| 4,114,902 | 9/1978 | Orlowski | 277/53 |
| 4,175,752 | 11/1979 | Orlowski | 277/53 |
| 4,290,610 | 9/1981 | Lizogub et al. | 277/24 X |
| 4,304,409 | 12/1981 | Orlowski | 277/53 |
| 4,466,620 | 8/1984 | Orlowski | 277/53 |
| 4,527,915 | 7/1985 | Ikarishi et al. | 384/480 |
| 4,560,172 | 12/1985 | Zimmermann et al. | 277/14 R X |
| 4,572,517 | 2/1986 | Rockwood et al. | 277/53 |
| 4,706,968 | 11/1987 | Orlowski | 277/53 |
| 4,743,034 | 5/1988 | Kakabaker et al. | 277/53 |
| 4,820,948 | 4/1989 | Rögelein | 384/478 X |
| 4,832,350 | 5/1989 | Orlowski | 277/53 |
| 4,861,045 | 8/1989 | Riley | 277/25 |

FOREIGN PATENT DOCUMENTS

| | | | |
|---|---|---|---|
| 195695 | 2/1958 | Austria | 384/135 |
| 638 | of 1915 | United Kingdom | 384/135 |
| 244916 | 12/1925 | United Kingdom | 277/68 |
| 294482 | 1/1929 | United Kingdom | 277/133 |
| 616961 | 1/1949 | United Kingdom | 277/53 |

Primary Examiner—William A. Cuchlinski, Jr.
Assistant Examiner—Scott W. Cummings
Attorney, Agent, or Firm—Zarley, McKee, Thomte, Voorhees, & Sease

[57] ABSTRACT

A unitary structure comprising a mechanical seal for rotating shafts consisting of a single ring member. The ring member has at one end a series of radial grooves in the internal bore and a trough extending across the grooves to an end of the ring. The ring also has at a second end at least one external labyrinth groove extending radially and serving to inhibit contamination. A sloped collection chamber having an expulsion port lies between the inner radial grooves and the external labyrinth groove. A non-metallic, flexible rotor is fitted within the sloped collection chamber whereby free flow across the axial width of the collection chamber is arrested and fluids are directed outwardly towards said expulsion port.

14 Claims, 1 Drawing Sheet

U.S. Patent     Dec. 24, 1991     5,074,567
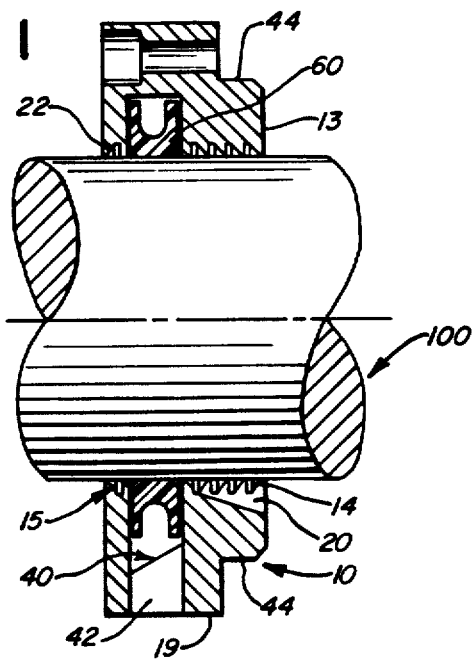
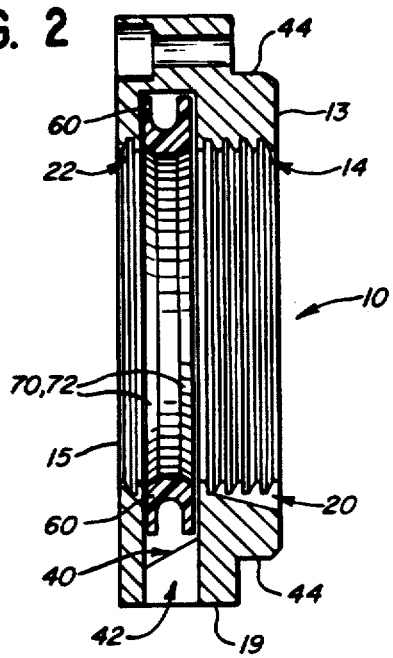
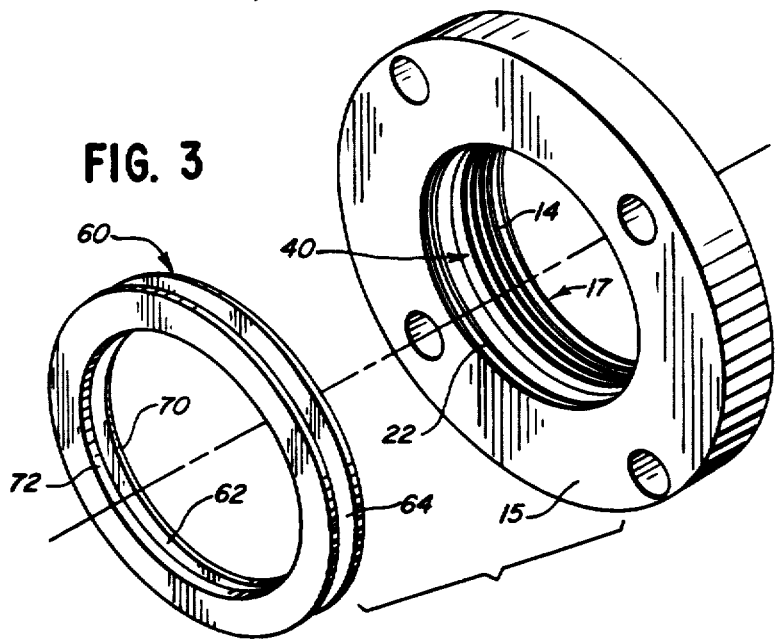
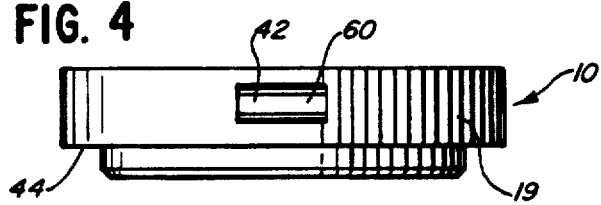
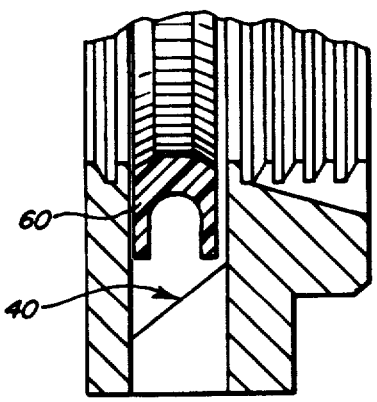

MODIFIED ONE PIECE LABYRINTH SEAL

BACKGROUND OF THE INVENTION

The present invention is deemed to be a considerable and meritorious improvement over the inventions disclosed in U.S. Pat. Nos. 4,022,479; 4,114,902; 4,175,752; 4,304,409; 4,466,620; and 4,706,968.

In many industries, it is extremely important to obtain a seal for rotating shafts emerging from a bearing and its housing which prevents the lubricants associated with the bearings from leaking externally of the associated housing or bearing support and for preventing contaminants in the environment from working themselves through the seal and into the lubricant for the bearings.

Various successful labyrinth bearing isolation devices exist in different, two-piece and three-piece combinations. Single-unit labyrinth sealing devices also exist. However, most of the single-unit labyrinth sealing devices are notoriously ineffective in dealing with contaminant intrusion, although they successfully retain lubricant. In application Ser. No. 07/135,698, now U.S. Pat. No. 4,832,350, a very serious and successful attempt was made to overcome many of the short comings of many of the existing single ring seals. However, when applied and practically used in some situations, the seal was found to also have short-comings. Contaminant intrusion was not successfully retarded at very low rotating speeds and when the ratio of inside diameter to axial width of the collection chamber exceeds three.

U.S Pat. No. 4,022,479 incorporates a disclosure wherein is taught a two-piece sealing ring structure which has an object elimination of the loss of lubricant from the bearings supporting a rotating shaft. The sealing ring structure disclosed also eliminates the movement of contaminants into the bearings and lubricant. Further disclosed is a sealing structure that is composed of two rings, preferably metal, one fixed to a housing and the other fixed to rotate with a shaft. The ring that is fixed to a housing has a labyrinth seal next to the shaft which prevents lubricant from moving outside of the housing along the shaft.

Also in U.S. Pat. No. 4,022,479, a joint is provided between the two rings which is an annular recess in the first ring and an annular flange on the second ring that fits within the annular recess of the first ring. The construction of the recess and the flange are complimentary and have axial and radial clearance, so that when one of the rings is rotating relative to the other, the seal will not bind o create heat by friction between them. There is also provided in the first ring member an opening that communicates from the annular recess to the outside of the first ring member. In the embodiment taught in this prior patent, the annular flange of the sealing ring member has axial notches. By this means, foreign matter that migrates into the joint between the ring members is expelled from the seal. It may be noted that the second ring member is made to rotate with the shaft by suitable frictional sealing means. However, there is no rubbing, wear or contact between the sealing ring members.

The invention of U.S. Pat. No. 4,114,902 was an ingenious improvement over the device disclosed in U.S. Pat. No. 4,022,479. The improvement included one or more collection grooves on the outer periphery of the annular flange of the second ring member. Additionally, the accommodating recess in the other ring member also contained one or more grooves. It was also taught in U.S. Pat. No. 4,114,902 that these complimentary collection grooves inhibit contaminant migration, regardless of relative peripheral speed of the rotating rings and to provide a tortuous path for the exclusion of foreign material even in the event of zero relative rotation.

U.S. Pat. No. 4,175,752 disclosed a labyrinth seal comprising a single ring having both an annular gap and a primary drain. The uniqueness of the device consists in the addition of the annular gap; lubricant is prevented from entering on to the shaft for which it is used.

U.S. Pat. No. 4,304,409 disclosed an improved sealing assembly which is a liquid pressure differential seal useful with a bearing shaft and housing. The seal includes a multi-ring sealing structure fixed to the housing and between the shaft and the housing. The multi-ring structure is arranged so that a first (stator) ring is fixed to the bearing housing and a second (rotor) ring is fitted to the rotating shaft. The improvement comprises a pressure and self compensating sealing device positioned radially to the shaft. It consists of a cover and a support spring partially encapsulated by the cover.

The invention of U.S. Pat. No. 4,466,620 is a further ingenious improvement over the devices disclosed in the aforementioned patents and solves additional problems. The improvement, among other items, includes a modification of the drain hole in the first sealing ring. That hole was modified so that its length is greater than its width like a milled slot. This improvement eliminates expulsion problems which occasionally arise due to the minor relative axial displacement of the sealing rings when the drain hole is circular. It provides a more effective means to expel foreign matter from the annular recess (or recesses if more than one flange-recess combination is provided) at the interface of the sealing rings.

U.S. Pat. No. 4,466,620 also encompassed an additional improvement wherein a portion of the first ring member that faces towards the bearing located inside its housing is extended to form a shielding protrusion. This improvement keeps off the liquid lubricant that is continuously thrown at the first ring member in certain applications, e.g. multiple gear and pinion speed reduction gearing.

U.S. Pat. No. 4,706,968 is a further unique and ingenious improvement over other labyrinth seal devices in having a third ring member which is located between the interface of the first stationary ring member and the second rotary ring member in complimentary recesses in the first ring member and the second ring member.

Many other labyrinth mechanical seals having at least two, sometimes three, eight or many more pieces have been taught. Indeed, the combinations and permutations of parts and pieces comprising labyrinth mechanical seals are exceeded in their bewilderment only by their complexity. See U.S. Pat. No. 1,458,684, *Cook;* U.S. Pat. No. 1,505,924, *Warren;* U.S. Pat. No. 1,976,532, *Wilfley;* U.S. Pat. No. 2,005,429, *Lichtenstein:* U.S. Pat. No. 2,281,905, *Young.* Basically each inventor relies upon mechanical action, or centrifugal force imparted by a rotating member to the labyrinth mechanical seal and its several pieces for its ability to function.

All of the above two and three piece labyrinth seals have universal applicability but require custom manufacture and so tend to be expensive. Thus, while being widely acknowledged and accepted, there remains some hesitancy in many companies to use them. Further, with the prevalence of cheap lip (contact) type seals, many companies prefer not to use the aforementioned labyrinth seals. Unfortunately, rubber or synthetic rubber lip seals must be replaced frequently and are notoriously ineffective in retaining lubricant and in dealing with contaminant intrusion.

The above identified two and three piece labyrinth seals are advances which have solved a large number of problems. However, certain problems are still encountered in various particular work applications. Problems remain in cases where a large amount of lubricant splash is encountered, thus necessitating increased radial clearances on the inside surface of the rotor insertion. Further problems are encountered in cases where axial shaft movement (oscillation) occurs, as in sleeve bearing electric motors.

Accordingly, it would be highly desirable to have a sealing ring structure that is inexpensive, compact in design, will successfully retain lubricant within the bearing, will not require a cartridge configuration to limit axial rotor movement, would not require increased axial extensions, will prevent contaminant intrusion and will have a broad range of applications.

SUMMARY OF THE INVENTION

The object of the invention is to provide a seal around rotating shafts and their housings to prevent leakage of lubricants and to inhibit the entry of contaminants into the shaft housings by the ingenious use of a modified one piece labyrinth lubricant inclusion/contaminant exclusion device in which contaminant exclusion capability is external o the bearing housing.

Generally two-piece labyrinth mechanical seals depend for efficacy upon a tortuous path, through which the migration of lubricating fluid or contaminants is virtually impossible. Commonly, one part of the mechanical labyrinth seal is affixed to the shaft and one part of the seal is affixed to the housing over which a seal is sought to be obtained. The interface, or point of mesh, between the two parts of the mechanical seal is often designed to provide a radial and axial labyrinth or tortuous path at that point of close proximity with the object of attaining a seal.

This invention is an entirely new development over the art of two or more piece labyrinth mechanical seals. This invention introduces a modified one piece labyrinth lubricant inclusion/contaminant exclusion seal which performs as well as a two piece labyrinth seal in most cases with rotation of the shaft and better than the two piece labyrinth seal when the shaft is not rotating or at rest and the inside diameter to axial width of the collection chamber is less than three.

The invention consists of a labyrinth mechanical seal having only one ring and a non-metallic, flexible rotor fitted within a sloped collection chamber of the single ring.

The seal, stationary to the housing is identified by having at one end a series of inner radial grooves in its bore, at least one external labyrinth groove at a second end, a sloped collection chamber having an expulsion port lying between the series of inner radial grooves and the external labyrinth groove, a non-metallic flexible rotor, either convex or concave on its outward extending face, fitted within the sloped collection chamber, an O-ring or other means on the seal outer periphery allowing it to be fixed to the shaft housing and a shoulder also on the outer periphery to limit axial movement inward or outward when the ring member is fitted to the shaft housing. The first series of radial grooves in the bore of the ring is connected by a groove or trough across the bottom, sloping down to provide a drain.

The ring also provides a labyrinth path to inhibit contaminant from entering onto the shaft by having at least one annular recess (contaminant inhibiting labyrinth groove) also in the bore spaced away from the first series of radial grooves, by the width of the collection chamber. The first series of inner radial grooves and the external labyrinth groove, along with the non-metallic flexible rotor fitted within the sloped collection chamber, in combination, provide a more effective seal by inhibiting contaminant passage into the internal structure. Virtually all matter making its way into either set of grooves will be expelled by rotary motion of the shaft or by gravity when the shaft is static. This strategy works statically also, because of the axial width of the collection chamber and its ratio to the diameter of the shaft at the interface of the outer wall of the bearing isolator, being greater than three to one.

At rest, flow inhibition from the outside to the inner oil-retention labyrinth pattern is based entirely on the axial width of the collection chamber and the labyrinth groove on the extreme outer wall. Flow that is allowed to penetrate into the collection chamber will be dealt with more efficiently and effectively if the flow can be redirected into the sloped collection chamber by a rotating member rather than to dissipate axial flow energy merely as a function of the axial expanse of the collection chamber.

This invention is unique and ingenious for the concept of introducing a sloped contaminant collection chamber having a non-metallic flexible rotor fitted within the collection chamber, at a point between the first series of radial grooves and the external labyrinth groove. The rotating shaft acts as a rotor, impelling contamination into the sloped collection chamber. From the sloped collection chamber the contaminant is expelled or drained through an expulsion port at the lowest surface of the collection chamber. This occurs because due to the non-metallic flexible rotor, either convex or concave on its outwardly extending face, within the collection chamber, free flow of contaminant across the axial width of the collection chamber is arrested and fluids are thus directed outwardly towards the outerwall and said expulsion port.

BRIEF DESCRIPTION OF THE DRAWING

FIG. 1 is a vertical sectional view showing the modified single ring seal in place on a shaft.

FIG. 2 is a vertical sectional view showing the inventive modified single ring seal.

FIG. 3 is a perspective view of the modified single ring seal of the present invention.

FIG. 4 is a bottom view of the seal.

FIG. 5 is an exploded sectional view showing a portion of the modified single ring seal.

DESCRIPTION OF THE PREFERRED EMBODIMENT

Referring first to FIG. 1, there is shown an arrangement in which the sealing structure of the present invention may be employed. There is shown the sealing ring of the present invention 10 in vertical crossection mounted on a shaft 100. The shaft extends through a bearing housing. Sleeve type bearings, pillow block bearings, journal bearing or rolling element bearings are conventionally fitted to the shaft 100. Conventional means are provided to provide lubricant to the race.

More details of this feature can be discerned from the aforementioned U.S. Pat. No. 4,022,479 of which parts are herein incorporated by reference.

In order to prevent leakage of the lubricant from inside the housing outwardly and the ingress of contaminant material from outside the housing into the bearings or lubricant, there is provided a sealing ring structure 10 consisting of a single ring described henceforth also as 10. The ring 10 has an internal radially extending face or first end 13, facing internally to the fixed housing, an external radially extending face or second end 15, facing externally to the fixed housing, an inner axially extending face 17, and an outer axially extending face 19. Radial grooves 14 are provided on the inner axially extending face 17 of the ring 10 and provide radial shoulders which engage lubricant tending to move axially outwardly along the shaft portion 100 and to guide it into an axially extending groove or trough 20 on the inside of the ring 10. The trough 20 joins the inner radial grooves 14 and leads back into the housing to provide a drain. The optimum radial clearance between the shaft 100 and inner radial grooves 14 is between 0.005 and 0.017 inches.

The second end 15 of the ring 10 is provided with at least one external labyrinth groove 22 that extends radially and serves to inhibit contaminant passage into the internal structure.

All corners of the external labyrinth groove 22 and all inside corners of the inner radial grooves 14 are sharp and unbroken to increase flow resistance and thus prevent fluid flow across such corners. The sharp unbroken corners are all set at exactly ninety (90) degree angles. The outside corners except that at the outside wall or second end 15, may be broken, as is good machining practice.

As can be seen in FIG. 1, the shaft 100 acts as a rotor, impelling contamination into collection chamber 40. The collection chamber 40 lies between external labyrinth groove 22 and inner radial grooves 14. As will be noted, particularly in FIG. 5, the collection chamber 40 slopes toward the outside. The slope being at 15 to 60 degree angle from the axis of the shaft centerline. In addition, the collection chamber 40 has an expulsion port 42. The use of such a collection chamber 40 with the expulsion port 42 allows this seal to maintain contaminant exclusion external to the bearing housing. Virtually all matter making its way into either external labyrinth groove 22 or inner radial grooves 14 will be expelled by rotary motion of shaft 100, or by gravity when the shaft 100 is static.

Fitted within sloped collection chamber 40 is a flexible rotor, 60, having an inward face 62 and outward face 64. The rotor 60 is non-metallic, preferably of a urethane material. As can be observed in FIGS. 1-3, the rotor 60 may have a concave outwardly extending face. Alternatively, the outwardly extending face may be convex. Further, the rotor 60 must be flexed in order to place same into the sloped collection chamber 40. The rotor 60 is fitted within the sloped collection chamber 40, and onto the shaft and acts to arrest the free flow of fluids across the axial width of the collection chamber 40, when the ratio of the inside diameter to axial width of the collection chamber exceeds three.

Having the flexible rotor 60 within sloped collection chamber 40 allows the direction of fluids outwardly towards the expulsion port 42. The flexible rotor has been found to operate effectively when the shaft 100 is rotating or static. Due to the flexible rotor 40, any flow which penetrates the collection chamber 40 is centrifugated into the sloped collection chamber expulsion port 42 and is redirected outwardly.

As will be noted from FIG. 4, the sloped expulsion port 42 also has a circumferentially extending width greater than its axially extending length. As can also be seen from that figure, the flexible rotor 60 lies over and covers most of the expulsion port 42. Having this alignment allows the flexible rotor 60, which as previously set out, either convex or concave on its outwardly extending face 64, even in static situations to arrest the free flow of fluids across the axial width of the collection chamber 40. The flexible rotor 60 accommodates a portion of the axial width of the sloped collection chamber 40. Thus, any cumbersome nature of the device is eliminated upon assembly to the shaft. This preferred embodiment having a flexible rotor 60, with either a convex or concave outwardly extending face 64, allows the seal to effectively deal with contaminant intrusion. Thus, such a seal can be used for a broad range of applications including pillow block bearings, electric motor shafts, medium duty pumps, etc.

The ring 10 also includes shoulder means 44 on its outer axially extending face 19. The shoulder means 44 limits the axial movement of the seal inward or outwards. The shoulder means 44 also acts to limit the depth to which said ring member may be inserted into housing. The shoulder means 44 also allows for the ring 10 to be placed securely and concentrically in the bearing housing.

The shoulder means 44, depending on the housing, may be 0 degrees to 20 degrees from the axial centerline of the ring member. Further, as previously set out, the shoulder means 44 limits the seal 10 axial movement on the shaft.

To center the rotor 60 on the shaft 100 there are specifically 30 degree angled leads 70, 72 on the inwardly extending face 62. The angled leads 70, 72 act as a chamfer. Thus, when the rotor 60 is placed on the shaft 100, the angled leads 70, 72 function to center the rotor 60 on the shaft 100.

Due to the fact that the seal is made of only one structural ring, clearances between parts need not be of concern. Thus, the seal can be made easily of any exotic metal, standard bronze and common metals. In addition any suitable non-metallic material such as engineering plastics, commercial PVC or fiber can be used for this seal. However, the flexible rotor 60 is made of a non-metallic material to allow for necessary flexing within the seal collection chamber 40.

Since this is a compact one piece bearing seal, problems previously encountered with axial and radial space limitations are overcome. Further, and also of importance, the problems usually associated with leakage in static situations are also overcome.

Based on this disclosure, many other modifications and ramifications will naturally suggest themselves to those skilled in the art. These are intended to be comprehended within the scope of this invention.

I claim:

1. A seal between a fixed housing and a rotating shaft comprising:
    a single ring member having a first end facing internally to the fixed housing, a second end facing externally of said housing and an outer surface adapted to be fixed and sealed to said housing;
    a series of radial grooves in the internal bore adjacent said first end of said single ring member;

said radial grooves disposed adjacent the shaft with a trough acting as a drain extending across said radial grooves to the first end of said ring member;

at least one labyrinth groove extending radially within said internal bore adjacent said second end of said ring member;

a collection chamber in said internal bore of said ring member, the chamber having spaced apart radially extending side walls and an interconnecting end wall, and having an expulsion port extending through said ring member; and a flexible annular rotor within the internal bore of said ring member, the rotor having opposite side walls spaced closely adjacent to the side walls and the end wall of the chamber and an arcuate outer peripheral edge interconnecting the side walls of the rotor.

2. The seal of claim 1 wherein said flexible rotor is disposed in said ring member between said radial grooves at said first end and said labyrinth groove at said second end.

3. The seal of claim 1 wherein said flexible rotor within said internal bore of said ring member is made of a urethane material.

4. The seal of claim 1 wherein said flexible rotor within said internal bore of said ring member is made of any flexible, non-metallic material.

5. The seal, of claim 1 wherein said collection chamber has a portion sloped toward the second end.

6. The seal of claim 2 wherein said flexible rotor is fitted in said collection chamber onto a shaft.

7. The seal of claim 1 wherein said collection chamber in said internal bore is located between said radial groove at said first end and said labyrinth groove at said second end.

8. The seal of claim 5 wherein said collection chamber is sloped at a 15 to 60 degree angle from the axis of the shaft centerline.

9. The seal of claim 1 having shoulder means on a portion of said ring member for limiting the axial movement of said ring member on said rotating shaft.

10. The seal of claim 1 wherein said expulsion port is located at the bottom of said collection chamber in said ring member providing a port for the expulsion of contaminants external to the bearing housing.

11. The seal of claim 7 wherein said shoulder means is an incline of from 0 to 20 degrees from the axial centerline.

12. The seal of claim 1 wherein said flexible rotor has two faces, a first outwardly extending face having either a curved shape and a second inwardly extending face including angled leads.

13. The seal of claim 12 wherein said flexible rotor inwardly extending face has 30 degree angled leads providing a method for centering said rotor on said shaft.

14. The seal of claim wherein said expulsion port has a circumferentially extending width greater than its axially extending length.

* * * * *